(12) United States Patent
Ishihara

(10) Patent No.: US 9,900,507 B2
(45) Date of Patent: Feb. 20, 2018

(54) IMAGE CAPTURE APPARATUS PERFORMING INTERVAL SHOOTING, IMAGE CAPTURE METHOD, AND STORAGE MEDIUM, IMAGE CAPTURE APPARATUS AND IMAGE CAPTURE METHOD

(71) Applicant: CASIO COMPUTER CO., LTD., Shibuya-ku, Tokyo (JP)

(72) Inventor: Masanori Ishihara, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/590,652

(22) Filed: Jan. 6, 2015

(65) Prior Publication Data

US 2015/0215533 A1    Jul. 30, 2015

(30) Foreign Application Priority Data

Jan. 28, 2014  (JP) ................. 2014-013040

(51) Int. Cl.
  *H04N 5/232*  (2006.01)
  *H04N 1/21*  (2006.01)
(52) U.S. Cl.
  CPC ....... *H04N 5/23241* (2013.01); *H04N 1/2133* (2013.01); *G03B 2217/007* (2013.01)
(58) Field of Classification Search
  None
  See application file for complete search history.

(56) References Cited

U.S. PATENT DOCUMENTS

| 6,002,436 A * | 12/1999 | Anderson | H04N 5/232 |
| | | | 348/372 |
| 2007/0031139 A1 | 2/2007 | Tsukuda | |
| 2015/0036998 A1 | 2/2015 | Ishimaru | |

FOREIGN PATENT DOCUMENTS

| JP | 2004126242 A | * | 4/2004 |
| JP | 2004222334 A | | 8/2004 |
| JP | 2006093867 A | | 4/2006 |
| JP | 2007158506 A | | 6/2007 |
| JP | 4277837 B2 | | 6/2009 |
| JP | 2012182526 A | | 9/2012 |
| JP | 2015029227 A | | 2/2015 |

OTHER PUBLICATIONS

Japanese Office Action (and English translation thereof) dated Jul. 14, 2015, issued in counterpart Japanese Application No. 2014-013040.
Japanese Office Action (and English translation thereof) dated Nov. 10, 2015, issued in counterpart Japanese Application No. 2014-013040.

* cited by examiner

*Primary Examiner* — Justin P Misleh
(74) *Attorney, Agent, or Firm* — Holtz, Holtz & Volek PC

(57) ABSTRACT

An image capture apparatus includes an interval shooting processing unit and an operation management control unit. It controls interval shooting to repeatedly execute photography processing that is set at a photographing interval that is set. The operation management control unit causes the contents of the power savings processing operation to change depending on the time required in photography processing, or the time required in recovery to a photography capable state. The image capture apparatus can thereby perform proper power savings control irrespective of the photography method of interval shooting.

2 Claims, 6 Drawing Sheets

| PHOTO-GRAPHIC SCENE | PHOTO-GRAPHING INTERVAL | NUMBER OF PHOTO-GRAPHS | FOCUS | EXPOSURE | WHITE BALANCE | SHUTTER SPEED | PHOTO-GRAPHY PROCESS-ING TIME | RECOVERY TIME |
|---|---|---|---|---|---|---|---|---|
| NORMAL | 20 SECONDS TO 1 HOUR | 10 TO 1000 PHOTO-GRAPHS | AF | AUTO | AUTO | 1/2000 TO 4 SECONDS | 5 SECONDS | 0 SECONDS |
| HDR ART | 30 SECONDS TO 1 HOUR | 10 TO 1000 PHOTO-GRAPHS | AF | AUTO | AUTO | AUTO | 20 SECONDS | 0 SECONDS |
| PORTRAIT | 25 SECONDS TO 1 HOUR | 10 TO 1000 PHOTO-GRAPHS | AF | AUTO | AUTO | AUTO | 5 SECONDS | 0 SECONDS |
| NIGHTSCAPE | PHOTO-GRAPHING INTERVAL ACCORDING TO SHUTTER SPEED | 10 TO 1000 PHOTO-GRAPHS | ∞ | FIXED | FIXED | 8 TO 30 SECONDS | 5 SECONDS | 0 SECONDS |
| FLOWER | 20 SECONDS TO 1 HOUR | 10 TO 1000 PHOTO-GRAPHS | AF | AUTO | AUTO | AUTO | 5 SECONDS | 0 SECONDS |
| NIGHT (FLASH) | 1 MINUTE TO 1 HOUR | 10 TO 1000 PHOTO-GRAPHS | AF | AUTO | AUTO | 1/60 SECONDS | 5 SECONDS | 30 SECONDS |

FIG. 3

IMAGE CAPTURE APPARATUS PERFORMING INTERVAL SHOOTING, IMAGE CAPTURE METHOD, AND STORAGE MEDIUM, IMAGE CAPTURE APPARATUS AND IMAGE CAPTURE METHOD

The present application claims the benefit of the priority of Japanese Patent Application No. 2014-013040, filed in Japan on Jan. 28, 2014, the subject matter of which is hereby incorporated herein by reference.

BACKGROUND OF THE INVENTION

Field of the Invention

The present invention relates to an image capture apparatus, an image capture method, and a storage medium.

Related Art

Conventionally, technology has been disclosed in Japanese Unexamined Patent Application, Publication No. 2006-93867, for example, for performing power saving control in interval shooting, since there are adverse effects such as exhaustion of the battery and a temperature rise of the image capture apparatus, when maintaining a photography standby state also for the interval time other than the time of actual photographic processing. With the technology disclosed in this Patent Document, the time of automatic power off and automatic power on is automatically set based on the value for the photographing interval.

SUMMARY OF THE INVENTION

An image capture apparatus according to a first aspect of the present invention includes:
an image capture control section that controls interval shooting to repeatedly execute photography processing that is set at a photographing interval that is set; and an electric power management control section that causes contents of a power savings processing operation to change according to a time required in the photography processing or a time required to recover to a photography capable state.

An image capturing method according to a second aspect of the present invention includes the steps of:
controlling interval shooting to repeatedly execute photography processing that is set, at a photographing interval that is set; and changing contents of a power savings processing operation, depending on a time required in the photography processing, or time required in recovery to a photography capable state.

A computer readable non-transitory storage medium according to a third aspect of the present invention is encoded with a program for enabling a computer that controls an image capture apparatus to realize:
an image capture control function of controlling interval shooting to repeatedly execute photography processing that is set at a photographing interval that is set; and an electric power control function of changing contents of a power savings processing operation, depending on a time required in the photography processing, or a time required in recovery to a photography capable state.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The following detailed descriptions of the invention can provide deeper understanding of the present application with reference to the drawings.

FIG. 3 is a view illustrating a photographic scene table;

DETAILED DESCRIPTION OF THE INVENTION

Embodiments of the present invention are explained below with reference to the drawings.

Figure 1:
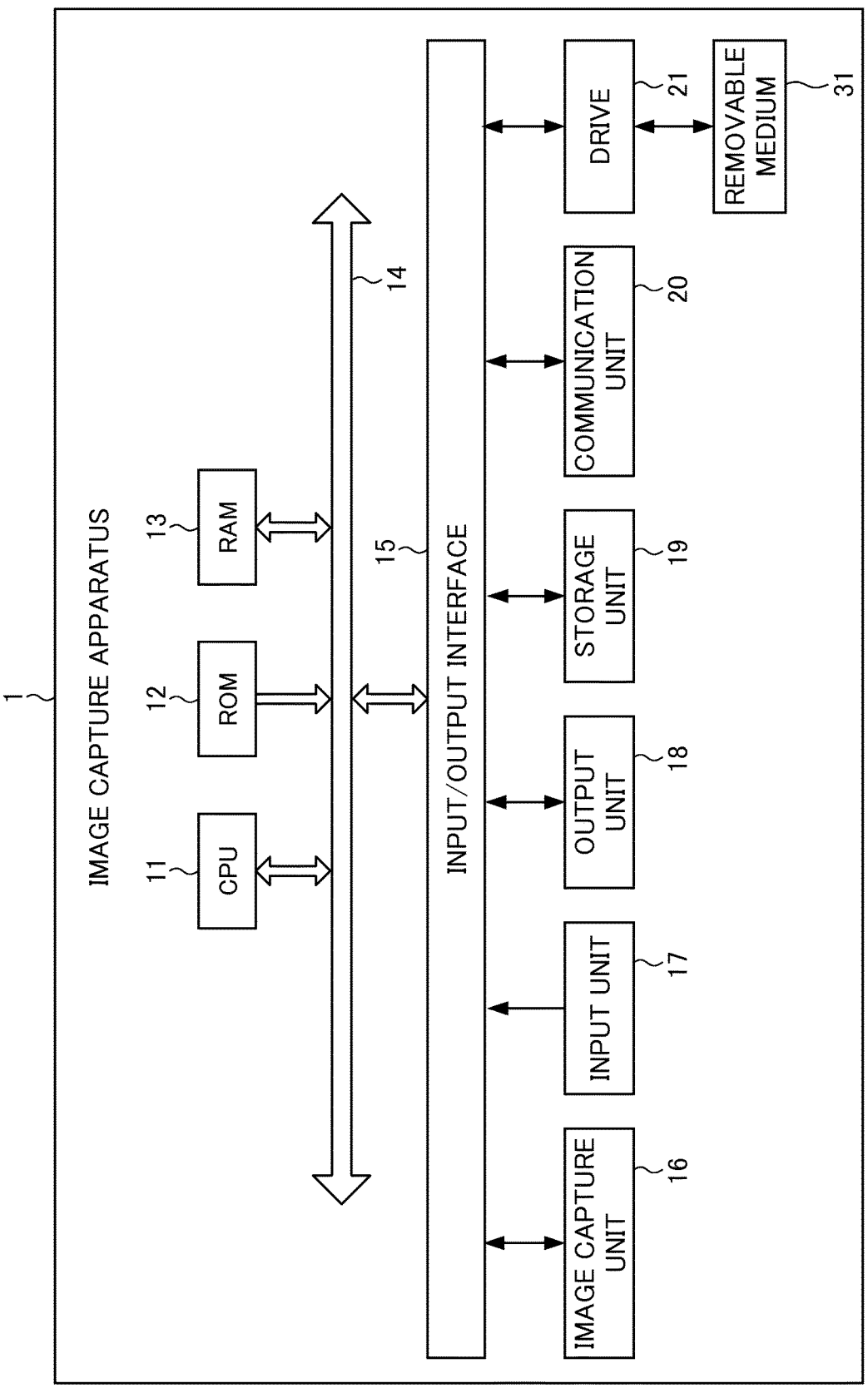
FIG. 1 is a block diagram showing a hardware configuration of an image capture apparatus according to an embodiment of the present invention.

FIG. 1 is a block diagram showing the hardware configuration of an image capture apparatus according to an embodiment of the present invention.

The image capture apparatus 1 is configured as, for example, a digital camera.

The image capture apparatus 1 include a CPU (Central Processing Unit) 11, ROM (Read Only Memory) 12, RAM (Random Access Memory) 13, a bus 14, an input/output interface 15, an image capture unit 16, an input unit 17, an output unit 18, a storage unit 19, a communication unit 20, and a drive 21.

The CPU 11 executes various processing according to programs that are recorded in the ROM 12, or programs that are loaded from the storage unit 19 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15.

The image capture unit 16 includes an optical lens unit and an image sensor, which are not shown.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such an output signal of the image capture unit 16 is hereinafter referred to as "data of a captured image". Data of a captured image is supplied to the CPU 11, an image processing unit (not illustrated), and the like as appropriate.

The input unit 17 is configured by various buttons and the like, and inputs a variety of information in accordance with instruction operations by the user.

The output unit 18 is configured by the display unit, a speaker, and the like, and outputs images and sound.

The storage unit 19 is configured by DRAM (Dynamic Random Access Memory) or the like, and stores data of various images.

The communication unit 20 controls communication with other devices (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

The image capture apparatus 1 configured in this way has functions of executing photographing processing with a photographing interval that is set and performing interval shooting that acquires a plurality of captured images (hereinafter, referred to as "interval shooting image") photographed in a predetermined photographing interval.

In addition, conventionally, for example, there have been problems in that when the photographing interval is too short, it enters the next photographing interval prior to the post-photography processing such as the saving processing being completed, and in that photography is not performed and interval photography not being definitely ensured. Therefore, the image capture apparatus 1 of the present embodiment has a function of reliably performing interval shooting by permitting the setting of the photographing interval, considering the processing related to photography (post-photography processing and pre-photography processing).

Furthermore, the image capture apparatus 1 of the present embodiment has a function enabling proper power savings control to be performed irrespective of the photography method of interval shooting, despite being configured so as to perform power savings control in the non-photography time of interval shooting. In other words, by performing power savings processing in consideration of the processing related to photography every time of photography in interval shooting (post-photography processing and pre-photography processing), the image capture apparatus 1 has a function that is able to reliably perform interval shooting, as well as effectively suppressing electric power consumption.

More specifically, the image capture apparatus 1 is configured so as to execute photography of interval shooting and calculate the remaining time until subsequent photography every time the post-photograph processing ends, and then determine whether to turn off the power source of the apparatus, perform sleep, or inhibit power savings (power source sleep off) based on the time thus calculated. For example, since a predetermined processing time is required also in saving processing like the filing after standard photography, by considering this processing, it is configured so as to determine whether to execute any of the processing of turning off functions except for the minimum required functions like the timer function of the apparatus in the timing at which processing ends, performing sleep to turn off the display of the output unit 18, or inhibiting power savings (power source sleep off). Furthermore, it is configured so as to determine to execute any of the processing among turning off the power source of the apparatus at the timing at which the required processing for the photographic scene finished, performing sleep, or inhibiting power savings (power source off or sleep), in the case of adopting a photographic scene for which a lot of time is required by the processing such as compositing images continuously captured after photography such as HDR art or All-In-Focus macro, in which from macro to infinity are brought into focus.

It should be noted that, although turning off the power source has a higher power savings effect than sleep, the time required in recovering to a photography capable state is longer.

In addition, in the case of performing flash charge photography, for example, since the warm-up time of the flash charging is required until the next photography, the image capture apparatus 1 performs recovery from turning off of the power source or sleep taking this warm-up time into consideration. The image capture apparatus 1 thereby performs proper power savings control without influence by the interval shooting.

Figure 2:
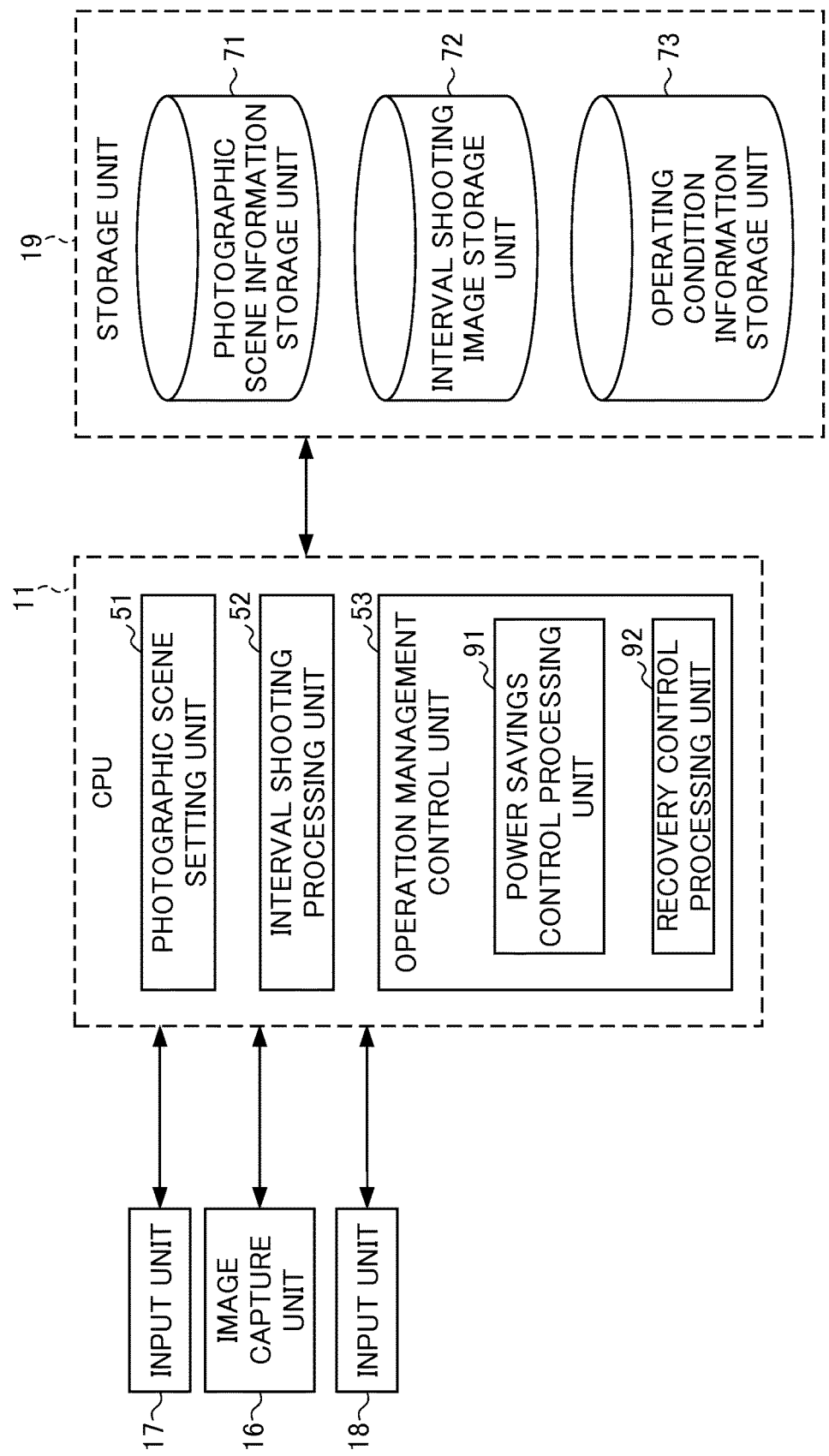
FIG. 2 is a functional block diagram showing a functional configuration for executing interval shooting processing, among the functional configurations of the image capture apparatus of FIG. 1.

FIG. 2 is a functional block diagram showing a functional configuration for executing the interval shooting processing, among the functional configurations of the image capture apparatus 1.

Interval shooting processing of the present embodiment performs interval shooting under settings depending on the photographic scene, as well as performing a sequence of processing to perform operation management related to power savings depending on the settings in a time period not performing photography.

In the interval shooting processing, a photography scene setting unit 51, an interval shooting processing unit 52 and an operation management control unit 53 function in the CPU 11, as shown in FIG. 2.

In addition, a photographic scene information storage unit 71, interval shooting image storage unit 72, and operating condition information storage unit 73 are established in a region of the storage unit 19.

Information of parameters corresponding to the photographic scene (hereinafter referred to as "photographic scene information") is stored in the photographic scene information storage unit 71.

The photographic scene information includes a table in which photographic scenes and parameters related to photography are associated (hereinafter referred to as "photographic scene table").

Herein, the photographic scene table will be explained.

FIG. 3 is a view illustrating a photographic scene table.

The photographic scene table associates the "photographic scene", "photographing interval", "number of photographs", "focus", "exposure", "white balance", "shutter speed", "photography processing time", and "recovery time".

As the "photographic scene" in the present embodiment, there are "normal", "HDR art" in the case of desiring an image on which HDR processing has been conducted, "portrait" in the case of photographing a person, "nightscape" in the case of photographing a nightscape, "flower" in the case of photographing a flower, and "night (flash charge)" in the case of performing nighttime photography.

In the respective photographic scenes, the photography parameters suited to the desired image and subject are initially set; for example, in "photographing interval", etc., it is configured to be selectable within predetermined ranges by the user.

In addition, in the respective photographic scenes, a time for post-processing is required after photography in the saving processing, etc. In addition, in relation to the time of post-processing after photography, in the case of "photographic scene: HDR art", there is a characteristic of the "photography processing time" requiring more time than other photographic scenes in order to conduct post-processing, etc. after photography. Although not illustrated in the photographic scene table of the present example, for example, it is considered similar for the photographic scene of All-In-Focus macro.

Therefore, the image capture apparatus 1 is configured so that the start time of turning off the power source and sleep take effect by considering the "photography processing time", in the case of performing management of the power source according to the operational control of power savings and recovery.

In addition, in the case of the photographing interval being shorter than the photography processing time and there being almost no remaining time when considering the photography processing time, it is configured so as to not perform turning off the power source or sleep.

In addition, in the case of "photographic scene: night (flash charge)", there is a characteristic of the recovery time for recovering to photography prior to resuming photography becoming necessary in order to make arrangements for flash charging in preparation for photography.

Therefore, the image capture apparatus 1 is configured so as to determine the existence of turning off the power source or sleep, by deducting the "recovery time", in the case of performing management of the power source by considering power savings.

With reference to FIG. 2 again, data of captured images acquired by the interval shooting is stored in the interval shooting image storage unit 72.

Information of conditions related to operational control of the apparatus corresponding to the photographic scene (hereinafter referred to as "operating condition information") is stored in the operating condition information storage unit 73.

The operating condition information of the present embodiment includes information of various condition expressions for determining whether to perform operations of power savings processing and recovery control processing.

The operations of power savings processing are operations of turning off the power source, sleep and inhibiting power savings control.

The condition for determining the operation of power savings control processing to transition to the power source off state is a case of satisfying the condition of T1 in the following power savings condition expression 1.

$$R-(b1+b3) \geq T1 \qquad \text{power savings condition expression 1}$$

It should be noted that "R" is the remaining time until subsequent photography from the timing at which the post-photography processing is executed in every interval shooting, "b1" is the time required from the power source off state until returning to a photography capable state (for example: 10 seconds), "b3" is the time required to recovery to another photography capable state that depends on the photographic scene, and "T1" is a threshold (for example: 1 minute) for transitioning to the power source off state.

The condition for determining operation of the power savings control processing to transition to the sleep state is the case of satisfying the condition of T2 in the following power savings condition expression 2.

$$R-(b2+b3) \geq T2 \qquad \text{power savings condition expression 2}$$

It should be noted that "R" is the remaining time until subsequent photography from the timing at which the post-photography processing is executed in every interval shooting, "b2" is the time required from the sleep state until recovering to a photography capable state (for example: 3 seconds), "b3" is the time required to recover to another photography capable state that depends on the photographic scene, and "T2" is a threshold (for example: 10 seconds) for transitioning to the sleep state.

Furthermore, the condition for determining the operation of power savings control processing to prohibit power savings control becomes cases not satisfying the conditions for the aforementioned power savings condition expressions 1 and 2, respectively.

In contrast, the condition for determining the operation of recovery control processing to recover from the power source off state is a case satisfying the condition of the following recovery condition expression 1.

$$R-(b1+b3) \leq 0 \qquad \text{recovery condition expression 1}$$

It should be noted that "R" is the remaining time until subsequent photography from the timing at which the post-photography processing is executed in every interval shooting, "b1" is the time required from the power source off state until recovering to a photography capable state (for example: 10 seconds), and "b3" is the time required to recover to another photography capable state that depends on the photographic scene.

In addition, the condition for determining the operation of recovery control processing to recover from the sleep state is a case of satisfying the condition of the following recovery condition expression 2.

$$R-(b2+b3) \leq 0 \qquad \text{recovery condition expression 2}$$

It should be noted that "R" is the remaining time until subsequent photography from the timing at which the post-photography processing is executed in every interval shooting, "b2" is the time required from the sleep state until returning to a photography capable state (for example: 3 seconds), and "b3" is the time required to recovery to another photography capable state that depends on the photographic scene.

The condition for determining the operation of recovery control processing to recover from the state inhibiting power savings control is a case satisfying the condition of the following recovery condition expression 3.

$$R-b3 \leq 0 \qquad \text{recovery condition expression 3}$$

It should be noted that "R" is the remaining time until subsequent photography from the timing at which the post-photography processing is executed in every interval shooting, and "b3" is the time required to recover to another photography capable state that depends on the photographic scene.

The image capture apparatus 1 operates by determining execution of the aforementioned power savings control processing from the power savings condition expressions 1 and 2, and determining execution of the recovery control processing from the recovery condition expressions 1 and 2. In other words, the image capture apparatus 1 comes to execute power savings control processing or recovery control processing from the respective conditions, according to the set photographic scene.

Referring back to FIG. 2, the photographic scene setting unit 51 performs setting of parameters related to photography according to the photographic scene.

More specifically, the photographic scene setting unit 51 accepts the selection of the photographic scene from the user. It should be noted that, in the present embodiment, it is configured so that the selection of the photographic scene is accepted from the user; however, it may be configured so that the apparatus automatically selects the photographic scene by automatically determining the surrounding environment, subject, etc.

In addition, the photographic scene setting unit 51 sets to parameters according to the photographic scene selected by the user by referencing the photographic scene information stored in the photographic scene information storage unit 71 (more specifically, the photographic scene table of FIG. 3), and also accepts parameter changes from the user.

The interval shooting processing unit 52 executes processing such as for the control of the image capture unit 16 related to interval shooting.

More specifically, the interval shooting processing unit 52 performs management of the number of photographs in order to acquire the set number of interval shooting images, and control of the image capture unit 16.

In addition, as the post-photography, processing the interval shooting processing unit 52 executes various post-photography processing based on the settings of the photographic scene, on the interval shooting images outputted from the image capture unit 16. For example, processing is executed such as the saving processing of images serving as standard processing of photographic scenes, and generation processing of images on which HDR processing was conducted or generation processing of images on which All-In-Focus macro processing was conducted as photographic scene characteristic processing.

In addition, the interval shooting processing unit 52 controls the interval shooting image storage unit 72 so as to store interval shooting images on which post-photography processing has been conducted.

The operation management control unit 53 controls the management of various operations such as operations related to power source management of the apparatus and operations related to recovery from a state through power source management. In addition, the operation management control unit 53 includes a power savings control processing unit 91 and recovery control processing unit 92.

It should be noted that, in the present embodiment, turning off the power source and sleep are performed as power source management; however, turning off the power source includes an interruption state of various functions accompanying the collapsed state of the lens, and sleep includes a temporary interruption state of various functions not accompanying the collapsed state of the lens.

The power savings control processing unit 91 executes processing related to the determination and control of turning off the power source, sleep and inhibition of power savings control.

More specifically, the power savings control processing unit 91 performs determination of turning off the power source, sleep and inhibition of power savings control, by considering the photographing interval of interval shooting and the post-photography processing. In the present embodiment, the power savings control processing unit 91 performs determination of turning off the power source, sleep and inhibition of power savings control, according to the power savings condition expressions 1 and 2 stored in the operating condition information storage unit 73. In other words, the power savings control processing unit 91 establishes turning off the power source by satisfying the power savings condition expression 1, establishes sleep by satisfying the power savings condition expression 2 without satisfying the power savings expression 1, and establishes inhibition of power savings control by not satisfying either of the power savings condition expressions 1 and 2.

In addition, the power savings control processing unit 91 executes any processing among turning off the power source, sleep and inhibition of power savings control, in response to the determination results of the power savings conditions. More specifically, the power savings control processing unit 91 executes processing to transition to the power source off state, transition to the sleep state, and to inhibit transition to the power saving states of power source off or sleep.

The recovery control processing unit 92 executes processing related to the determination and control of the function recovery of the apparatus from the power source off state, sleep state and power savings control inhibition state (recovery to the photography standby state).

More specifically, the recovery control processing unit 92 performs determination for recovery from the power source off state, sleep state and power savings control inhibition state, by considering the photographing interval of interval shooting and the pre-photography processing. In the present embodiment, the recovery control processing unit 92 performs determination for recovery from the power source off state, sleep state and power savings control inhibition state, according to the recovery condition expressions 1 to 3 stored in the operating condition information storage unit 73. In other words, the recovery control processing unit 92 establishes recovery by satisfying the recovery condition expression 1 in the power source off state, satisfying the recovery condition expression 2 in the sleep state, or satisfying the recovery condition expression 3 in the power savings control inhibition state.

In addition, the recovery control processing unit 92 executes recovery processing to the photography standby state in response to the determination results of the power savings condition. The recovery processing establishes a simple photography capable state, and also includes warm-up processing of flash charge, etc. according to the photographic scene.

Figure 4:
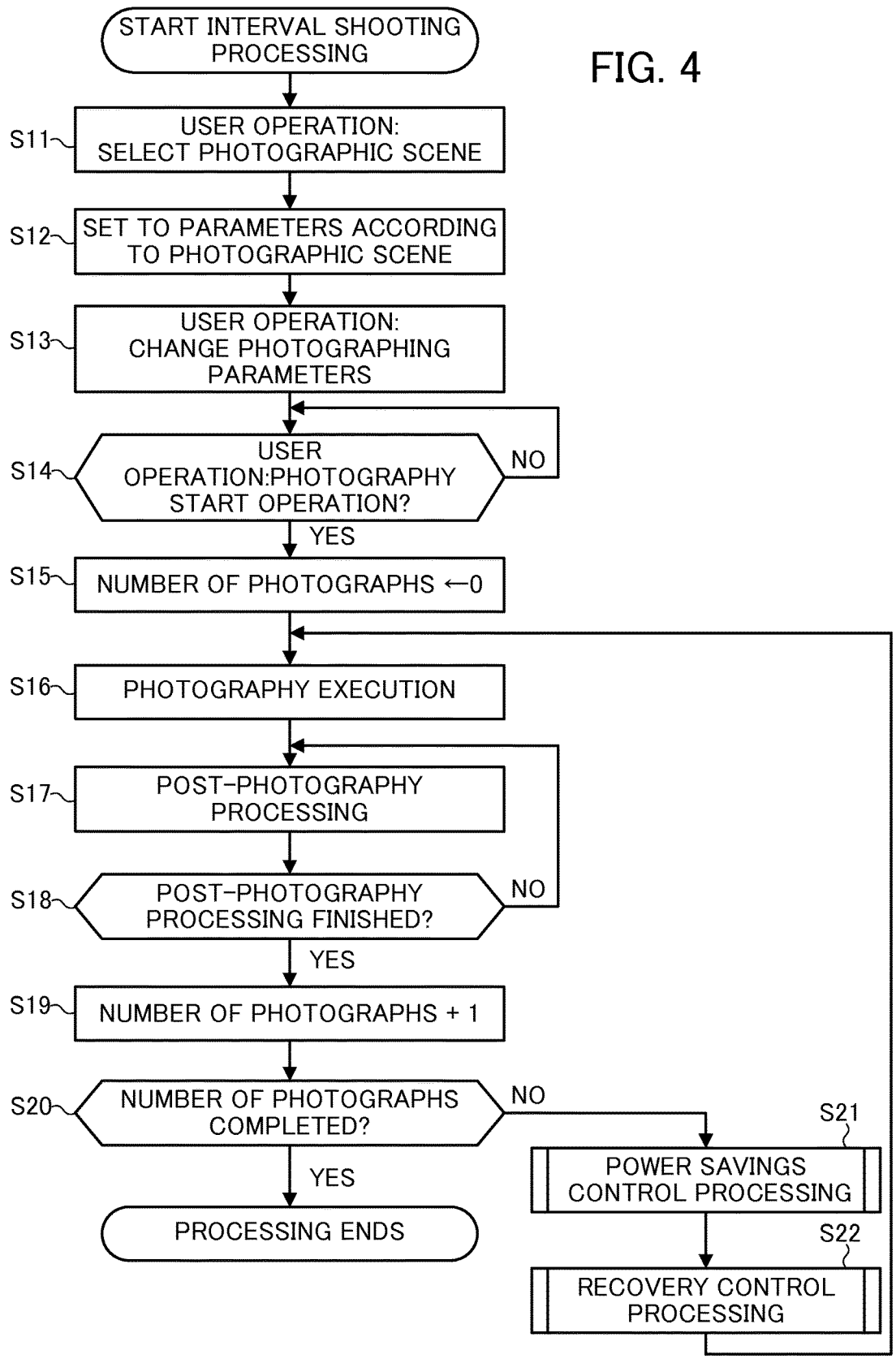
FIG. 4 is a flowchart illustrating a flow of interval shooting processing executed by the image capture apparatus of FIG. 1 having the functional configuration of FIG. 2.

FIG. 4 is a flowchart illustrating a flow of the interval shooting processing executed by the image capture apparatus 1 of FIG. 1 having the functional configurations of FIG. 2.

The interval shooting processing starts with an operation of starting the interval shooting processing on the input unit 17 by a user.

In Step S11, the photographic scene setting unit 51 accepts the selection of the photographic scene via the input unit 17 from the user.

In Step S12, the photographic scene setting unit 51 sets to parameters according to the photographic scene selected by the user, by referencing the photographic scene table stored in the photographic scene information storage unit 71.

In Step S13, the photographic scene setting unit 51 accepts a change in the parameters of the photographic scene set via the input unit 17 by the user.

In Step S14, the interval shooting processing unit 52 determines whether there is a photography start operation via the input unit 17 by the user.

In the case of there not being a photography start operation, it is determined as NO in Step S14, and enters the standby state until there is a photography start operation.

In the case of there being a photography start operation, it is determined as YES in Step S14, and the processing advances to Step S15.

In Step S15, the interval shooting processing unit 52 counts the number of photographs as 0 in preparation for future interval shooting.

In Step S16, the interval shooting processing unit 52 executes photography. In other words, the interval shooting processing unit 52 controls the image capture unit 16 based on the settings of the photographic scene.

It should be noted that the interval shooting processing unit 52 may be configured so as to do monitoring and display an image on the output unit 18 upon photography, and may be configured so as to interrupt monitoring in order to curb electrical power consumption and interrupt the display on the output unit 18.

In Step S17, the interval shooting processing unit 52 executes post-photography processing. In other words, the interval shooting processing unit 52 executes various post-photography processing based on the setting of the photographic scene, on the interval shooting images outputted from the image capture unit 16. Subsequently, the interval shooting processing unit 52 causes the interval shooting images on which post-photography processing has been conducted to be stored in the interval shooting image storage unit 72.

In Step S18, the interval shooting processing unit 52 determines whether post-photography processing has finished.

In the case of the post-photography processing not finishing, it is determined as NO in Step S18, and the processing returns to Step S16.

In the case of post-photography processing finishing, it is determined as YES in Step S18, and the processing advances to Step S19.

In Step S19, the interval shooting processing unit 52 counts the number of photographs by incrementing by 1.

In Step S20, the interval shooting processing unit 52 determines whether the number of photographs has completed.

In the case of the number of photographs completing, it is determined as YES in Step S20, and the interval shooting processing ends.

In the case of the number of photographs not completing, it is determined as NO in Step S20, and the processing advances to Step S21.

In Step S21, the power savings control processing unit 91 executes power savings control processing. The details of power savings control processing will be described later.

In Step S22, the recovery control processing unit 92 executes recovery control processing. The details of recovery control processing will be described later. Subsequently, the processing returns to Step S16.

Next, the detailed flow of power savings control processing in the interval shooting processing will be explained.

Figure 5:
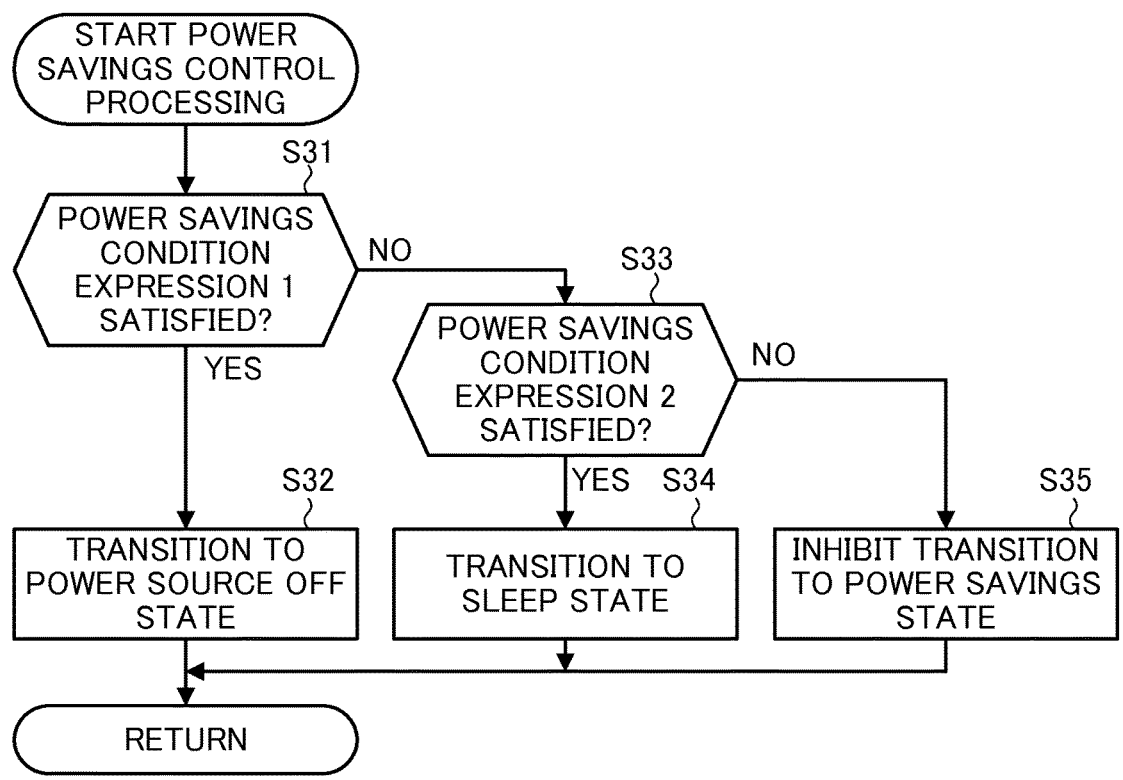
FIG. 5 is a flowchart illustrating the detailed flow of power savings control processing in the interval shooting processing.

FIG. 5 is a flowchart illustrating the detailed flow of power savings control processing in the interval shooting processing.

In Step S31, the power savings control processing unit 91 determines whether satisfying the power savings condition expression 1. In other words, it determines whether making transition to the power source off state is appropriate.

In the case of the not satisfying the power savings condition expression 1, it is determined as NO in Step S31, and the processing advances to Step S33. The processing of Steps S34 and higher will be described later.

In the case of satisfying the power savings condition expression 1, i.e. in the case of making transition to the power source off state being determined as appropriate, it is determined as YES in Step S31, and the processing advances to Step S32.

In Step S32, the power savings control processing unit 91 controls various functional parts of the apparatus so as to transition to the power source off state.

In Step S33, the power savings control processing unit 91 determines whether satisfying the power savings condition expression 2. In other words, it determines whether making transition to the sleep state is appropriate.

In the case of not satisfying the power savings condition expression 2, it is determined as NO in Step S33, and the processing advances to Step S35. The processing of Step S35 will be described later.

In the case of satisfying the power savings condition expression 2, i.e. in the case of determining that making transition to the sleep state is appropriate, it is determined as YES in Step S33, and the processing advances to Step S34.

In Step S34, the power savings control processing unit 91 controls various functional parts of the apparatus so as to transition to the sleep state.

In Step S35, the power savings control processing unit 91 inhibits power savings control (transition to a power savings state). In other words, it is determined that making transition to the power source off state and transition to the sleep state is not appropriate, and the power savings control processing unit 91 controls the respective functional parts of the apparatus so as to maintain the active state.

Next, the detailed flow of recovery control processing in the interval shooting processing will be explained.

Figure 6:
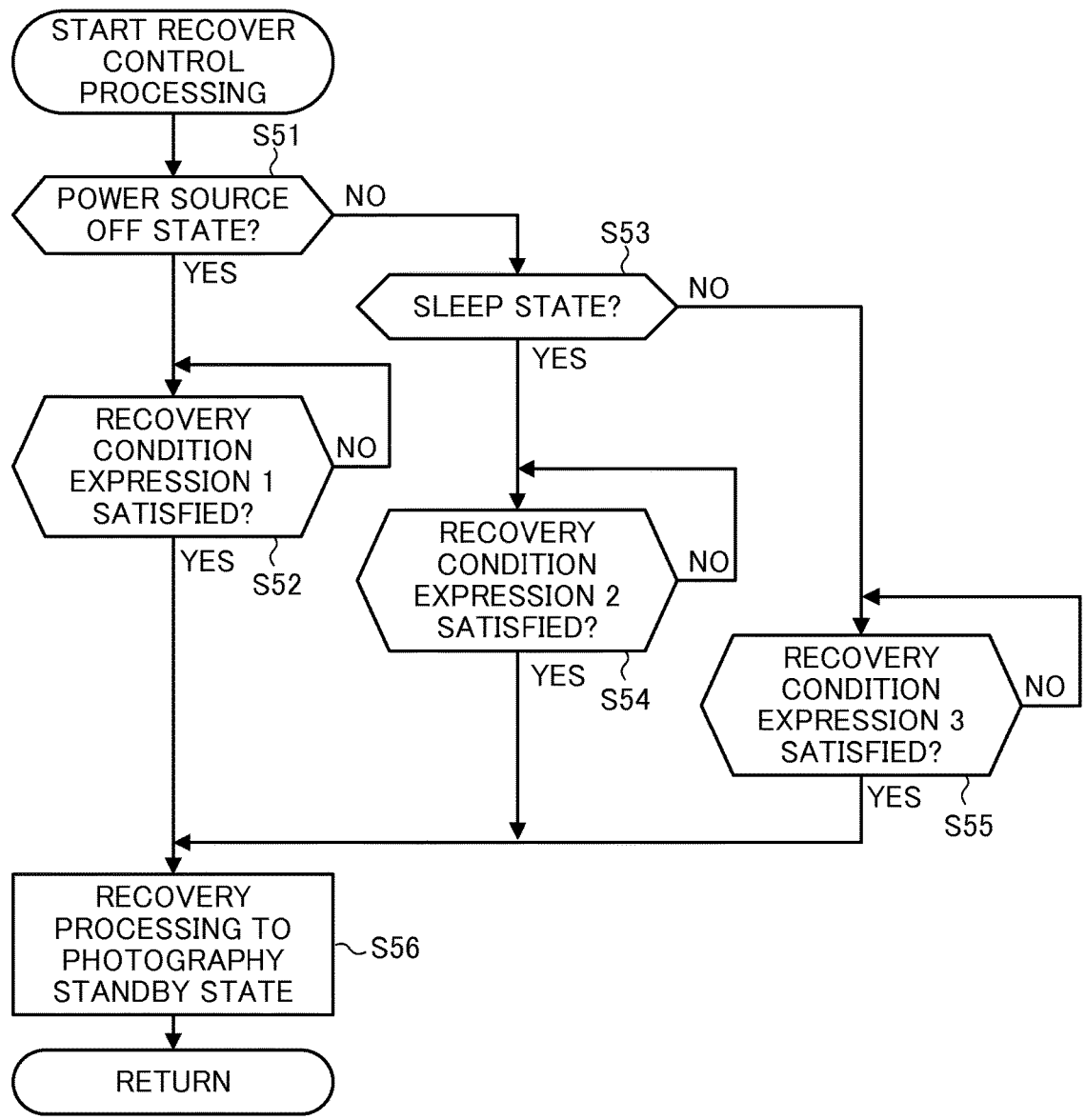
FIG. 6 is a flowchart illustrating the detailed flow of recovery control processing in the interval shooting processing.

FIG. 6 is a flowchart illustrating the detailed flow of recovery control processing, in the interval shooting processing.

In Step S51, the recovery control processing unit 92 determines whether being the power source off state.

In the case of not being the power source off state, it is determined as NO in Step S51, and the processing advances to Step S53. The processing of Steps S53 and higher will be described later.

In Step S52, the recovery control processing unit 92 determines whether satisfying the recovery condition expression 1. In other words, it determines whether being before the time required to recover from the power source off state to a photography capable state.

In the case of not satisfying the recovery condition expression 1, it is determined as NO in Step S52, and enters the standby state until entering a state satisfying the recovery condition expression 1.

In the case of satisfying the recovery condition expression 1, i.e. in the case of being before the time required to recover from the power source off state to a photography capable state, it is determined as YES in Step S52, and the processing advances to Step S56. The processing of Step S56 will be described later.

In Step S53, the recovery control processing unit 92 determines whether being the sleep state.

In the case of not being the sleep state, it is determined as NO in Step S53, and the processing advances to Step S55.

In the case of being the sleep state, it is determined as YES in Step S53, and the processing advances to Step S54.

In Step S54, the recovery control processing unit 92 determines whether or not satisfying the recovery condition expression 2. In other words, it determines whether being before the time required in recovery from the sleep state to a photography capable state.

In the case of not satisfying the recovery condition expression 2, it is determined as NO in Step S54, and enters a standby state until entering a state satisfying the recovery condition expression 2.

In the case of satisfying the recovery condition expression 2, i.e. in the case of being before the time required to recover from the sleep state to a photography capable state, it is determined as YES in Step S54, and the processing advances to Step S56.

In Step S55, the recovery control processing unit 92 determines whether or not satisfying the recovery condition expression 3. In other words, it determines whether being before the time required to recover from an active state to another photography capable state that depends on the photographic scene.

In the case of not satisfying the recovery condition expression 3, it is determined as NO in Step S55, and enters a standby state until entering a state satisfying the recovery condition expression 3.

In the case of satisfying the recovery condition expression 3, i.e. in the case of being before the time required to recover from the active state to another photography capable state that depends on the photographic scene, it is determined as YES in Step S55, and the processing advances to Step S56.

In Step S56, the recovery control processing unit 92 executes recovery processing to a photograph standby state.

Modified Embodiment

Other examples of the power savings condition expressions and recovery condition expressions of the aforementioned embodiment will be explained.

In the present example, the following expressions are applicable in place of the power savings condition expressions 1 and 2 of the aforementioned embodiment. In the power savings condition expressions 1 and 2 of the aforementioned embodiment, the remaining time until the next photography is calculated every time post-photography processing finishes, and control related to power savings is determined by the calculation results thereof; however, with the power savings condition expressions 1 and 2 of the present example, control related to power savings is determined by the difference between the photographing interval set and the post-photography processing time according to the photographic scene set in advance in the photographic scene table of FIG. 3.

The condition for determining the operation of the power savings control processing to transition to the power source off state is a case of satisfying the condition of T1 in the following power savings condition expression 1.

$$I-(a+b1+b3) \geq T1 \quad \text{power savings condition expression 1}$$

It should be noted that "I" is the photographing interval, "a" is the time required in the photography processing for every photographic scene, "b1" is the time required to recover from the power source off state to a photography capable state (for example: 10 seconds), "b3" is a the time required to recover to another photography capable state for every photographic scene, and "T1" is a threshold for transitioning to the power source off state (for example: 3 minutes).

In addition, the condition for determining the operation of power savings control processing for transitioning to the sleep state is a case of satisfying the condition of T2 in the following power savings condition expression 2.

$$I-(a+b2+b3) \geq T2 \quad \text{power savings condition expression 2}$$

It should be noted that "I" is the photographing interval, "a" is the time required in the photography processing for every photographic scene, "b2" is the time required to recover from the sleep state to a photography capable state (for example: 3 seconds), "b3" is the time required to recover to another photography capable state for every photographic scene, and "T2" is a threshold for transitioning to the sleep state (for example: 1 minute).

Furthermore, the condition for determining the operation of the power savings control processing to inhibit power savings control becomes a case of not satisfying the conditions for the aforementioned power savings condition expressions 1 and 2, respectively.

In contrast, the recovery condition expressions 1 to 3 for determining the operation of the recovery control processing are the same as the aforementioned embodiment.

The image capture apparatus 1 configured in the above way includes the interval shooting processing unit 52 and the operation management control unit 53.

The interval shooting processing unit 52 controls interval shooting to repeatedly execute the photography processing set at the photographing interval set.

The operation management control unit 53 causes the contents of the power savings processing operation to change depending on the time required in photography processing, or difference from the time required in recovery to a photography capable state.

The image capture apparatus 1 can thereby perform proper power savings control irrespective of the photography method of interval shooting, due to causing the contents of the power savings processing operation to change depending on the time required in photography processing, or the time required to recover to a photography capable state.

The operation management control unit 53 allows the contents of the power savings processing operation to be determined variably, based on the photographing interval set, which is controlled by the interval shooting processing unit 52, and the time required in photography processing set.

The image capture apparatus 1 can thereby perform proper power savings control irrespective of the photography method of interval shooting.

The operation management control unit 53 causes the contents of the power savings processing operation to change depending on the remaining time until the next photography after photography processing finishes.

The image capture apparatus 1 can thereby perform proper power savings control irrespective of the photography method of interval shooting.

The operation management control unit 53 inhibits transition to the power savings processing state in the case of the difference between the photographing interval set, which is controlled by the interval shooting processing unit 52, and the time required in photography processing set being shorter than a predetermined time.

The image capture apparatus 1 can thereby reliably perform interval shooting without performing unnecessary power savings processing operations, and can definitely ensure interval shooting.

In addition, the image capture apparatus 1 enables arbitrary setting for the photography processing set and photographing interval set.

The operation management control unit 53 allows the contents of the power savings processing operation to be determined variably based on the photographing interval set arbitrarily, which is controlled by the interval shooting processing unit 52, and the time required in the photography processing set arbitrarily.

The image capture apparatus 1 can thereby reliably perform interval shooting, and can definitely ensure interval shooting.

The interval shooting processing unit 52 controls interval shooting by changing the setting of photography processing and the setting of the photographing interval according to the photographic scene.

The operation management control unit 53 causes the contents of the power savings processing operation to change based on the time required in photography processing corresponding to the photographic scene.

The image capture apparatus 1 can thereby definitely ensure interval shooting irrespective of the photography method of interval shooting.

The operation management control unit 53 causes the contents of the power savings processing operation to change based on the photographing interval set as controlled by the interval shooting processing unit 52 and the time required to recover to a photography capable state.

The image capture apparatus 1 can thereby definitely ensure interval shooting, as well as being able to perform proper power savings control irrespective of the photography method of interval shooting.

The operation management control unit 53 causes the contents of the power savings processing operation to change based on the remaining time until the next photography after the photography processing ends, and the time required to recover to a photography capable state.

The image capture apparatus 1 can thereby definitely ensure interval shooting, as well as being able to perform proper power savings control irrespective of the photography method of interval shooting.

The operation management control unit 53 inhibits power savings processing operations in a case of the difference between the photographing interval set, which is controlled by the interval shooting processing unit 52, and the time required to recover to a photography capable state being shorter than a predetermined time.

The image capture apparatus 1 can thereby definitely ensure interval shooting without unnecessarily performing power savings processing operations.

The interval shooting processing unit 52 controls the interval shooting by changing the settings of photography processing according to the photographic scene.

The operation management control unit 53 causes the contents of the power savings processing operation to change based on the time required to recover to a photography capable state corresponding to a photographic scene.

The image capture apparatus 1 can thereby definitely ensure interval shooting irrespective of the photography method of interval shooting.

The time required to recover to a photography capable state is the time required to recover from the power savings state to a photography capable state, or the time required in photography preparation (for example, flash charging, etc.) different from recovery from the power savings state.

The image capture apparatus 1 can thereby definite ensure interval shooting.

The operation management control unit 53 causes the contents of the power savings processing operation to change depending on the type of power savings processing operation (for example, turning off the power source, sleep, inhibition of power savings control, etc.).

The image capture apparatus 1 can thereby effectively suppress electric power consumption.

It should be noted that the present invention is not to be limited to the aforementioned embodiment, and that modifications, improvements, etc. within a scope that can achieve the objects of the present invention are also included in the present invention.

In the aforementioned embodiment, the difference between a fixed photographing interval set in advance for every photographic scene and the photography processing time along with the time required in other recovery may be stored in the photographic scene table, and the power savings control and recovery control may be determine by the value thereof.

In addition, in the aforementioned embodiment, for the purpose of confirming a live view from the power savings state or confirming the number of photographs, it may be set to be recoverable from the power savings state to an active state by way of a predetermined operation on the input unit 17.

In addition, in the aforementioned embodiment, it may be set to be able to forcibly end interval shooting by way of a predetermined operation on the input unit 17, prior to photographing the number of photographs set ending.

In the aforementioned embodiments, the digital camera has been described as an example of the image capture apparatus 1 to which the present invention is applied, but the present invention is not limited thereto in particular.

For example, the present invention can be applied to any electronic device in general having an interval shooting processing function. More specifically, for example, the present invention can be applied to a lap-top personal computer, a printer, a television, a video camera, a portable navigation device, a smart phone, a cell phone device, a smart phone, a portable gaming device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the image capture apparatus 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 20 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the spirits of the present invention. Such embodiments and modifications are included in the scope of the invention and the summary described in the present specification, and are included in the invention recited in the claims as well as the equivalent scope thereof.

What is claimed is:

1. An image capture method comprising:
   controlling interval shooting to repeatedly execute a variably set photography processing at a variably set photographing interval, wherein different photography processings and different times required in the respective photography processings are set in advance for each of a plurality of photographic scenes which are selectable based on a target to be photographed;
   controlling the interval shooting, in accordance with a selected photographic scene among the plurality of photographic scenes, based on the set photographing interval and photography processing set in advance for the selected photographic scene; and
   controlling contents of a power savings processing operation to change according to the time required in the photography processing set in advance for the selected photographic scene and the set photographing interval,
   wherein different times required to recover to a photography capable state are set in advance for each of the plurality of photographic scenes, and
   wherein the contents of the power savings processing operation is controlled, in accordance with the selected photographic scene among the plurality of photographic scenes, to be different according to the selected photographic scene, based on the different time, which is set in advance according to the selected photographic scene, required to recover to the photography capable state.

2. An image capture method comprising:
   controlling interval shooting to repeatedly execute a variably set photography processing at a variably set photographing interval for a variably set number of photographs; and
   controlling contents of a power savings processing operation according to at least one of a time required in the set photography processing or a time required to recover to a photography capable state and the photographing interval, by selecting any one of the contents of the power savings processing operation;
   wherein:
   the contents of the power savings processing operation is switched among: (i) a first power savings processing operation, (ii) a second power savings processing operation different from the first power savings processing operation, and (iii) a processing operation of inhibiting the power savings processing operation,
   the first power savings processing operation comprises turning off of the power source of the image capture apparatus;
   the second power savings processing operation comprises setting the image capture apparatus to a sleep state; and
   the contents of the power savings processing operation is controlled, according to the time required in the set photography processing or the time required to recover to the photography capable state and the photographing interval, in a priority order of: (i) turning off of the power source of the image capture apparatus, (ii) setting the image capture apparatus to the sleep state, and (iii) the processing operation of inhibiting the power savings processing operation.

* * * * *